R. A. PETERS.
POLE AND POST HOLE DIGGER.
APPLICATION FILED APR. 30, 1912.
1,032,936.
Patented July 16, 1912.
2 SHEETS—SHEET 1.
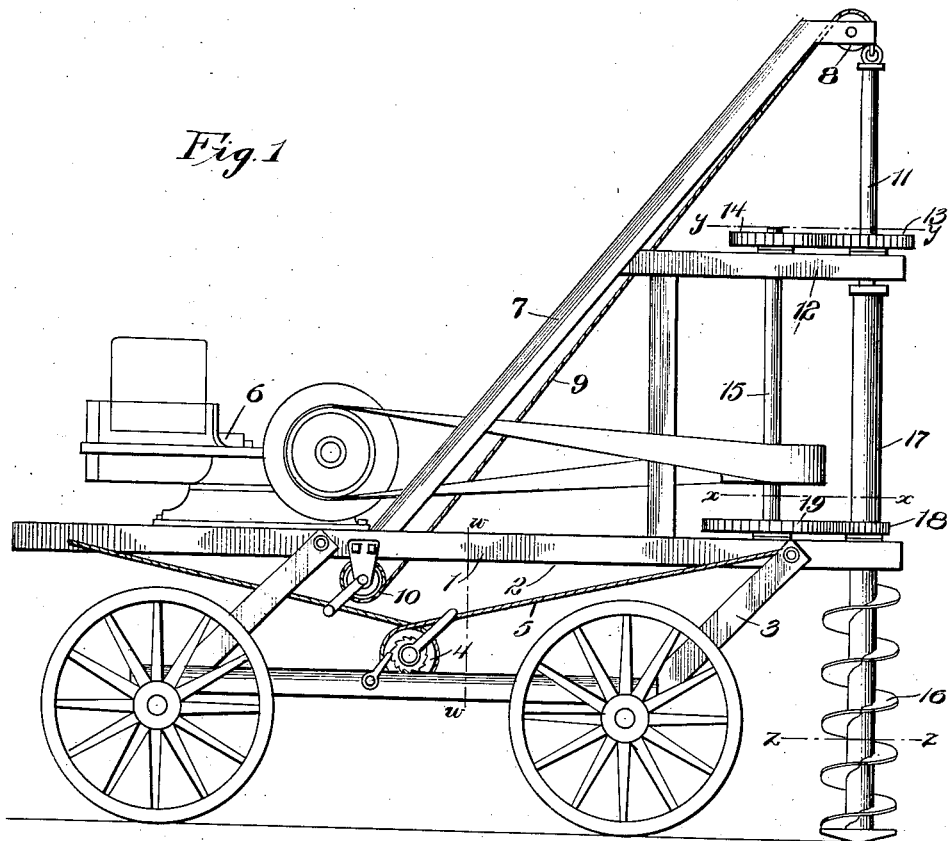
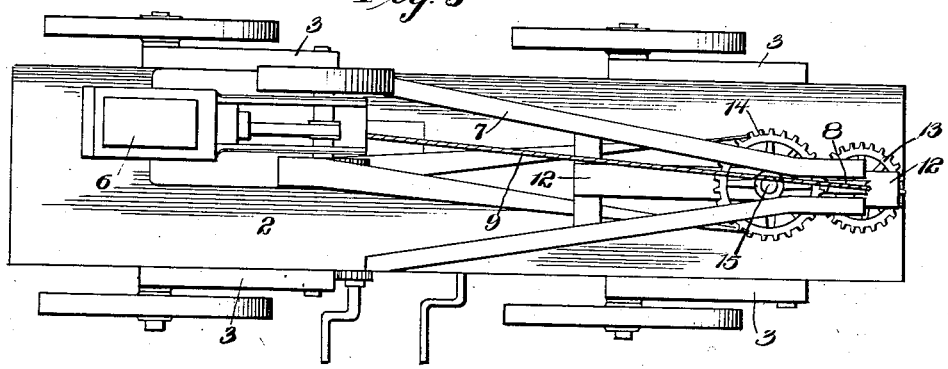
Witnesses
Wm H. Mulligan
V. B. Hillyard
Inventor
R. A. Peters.
By Victor J. Evans
Attorney R. A. PETERS.
POLE AND POST HOLE DIGGER.
APPLICATION FILED APR. 30, 1912.
1,032,936.
Patented July 16, 1912.
2 SHEETS—SHEET 2.
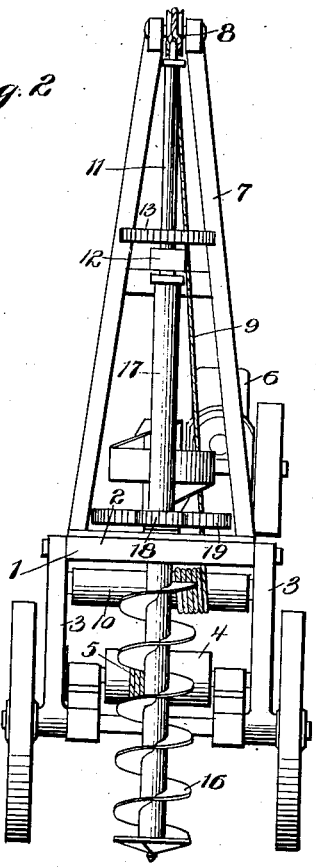
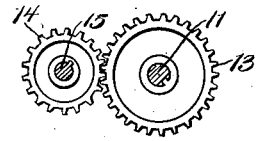
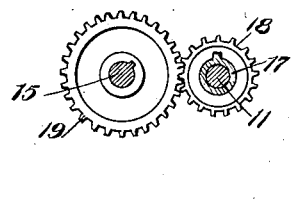
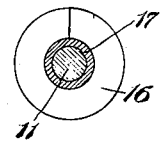
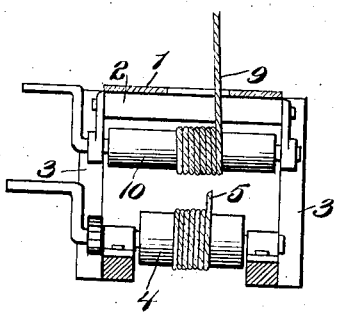
Witnesses
Wm H. Mulligan.
O. B. Hillyard.
Inventor
R. A. Peters.
By Victor J. Evans.
Attorney

UNITED STATES PATENT OFFICE.

ROY A. PETERS, OF STOCKTON, ILLINOIS.

POLE AND POST HOLE DIGGER.

1,032,936. Specification of Letters Patent. Patented July 16, 1912.

Application filed April 30, 1912. Serial No. 694,130.

*To all whom it may concern:*

Be it known that I, ROY A. PETERS, a citizen of the United States, residing at Stockton, in the county of Jo Daviess and State of Illinois, have invented new and useful Improvements in Pole and Post Hole Diggers, of which the following is a specification.

The present invention provides a machine designed with especial reference to the digging of holes in which posts are to be planted when constructing a line of fencing.

The machine embodies a truck for convenience of transporting the excavating mechanism from point to point, said truck embodying a platform upon which the motor and operating mechanism are mounted, the platform being adapted to be raised or lowered for elevating or depressing the excavating mechanism as may be required in the operation of the machine.

The invention contemplates an excavator of the boring type and an elevator of the screw variety for removing the cuttings from the opening as the boring tool advances to the work, the boring tool and earth elevator being independently driven at different rates of speed so as to insure the opening being kept clear of earth.

The invention further contemplates novel means for raising and lowering the boring tool and the platform and peculiar operating mechanism for driving the boring tool and elevator at any point in their vertical adjustment.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side view of a machine for digging post holes embodying the invention. Fig. 2 is a front view. Fig. 3 is a top plan view. Fig. 4 is a detail section on the line *y—y* of Fig. 1. Fig. 5 is a detail section on the line *x—x* of Fig. 1. Fig. 6 is a detail section on the line *z—z* of Fig. 1. Fig. 7 is a detail section on the line *w—w* of Fig. 1, looking toward the rear, as indicated by the arrow.

Corresponding and like parts are referred to in the following description, and indicated in all the views of the drawings, by the same reference characters.

The numeral 1 designates a truck which may be of any suitable construction best adapted for the particular purpose in the practical embodiment of the machine. A platform 2 is mounted upon the truck in a manner to admit of its raising or lowering and as shown links 3 constitute the supporting and connecting means between the platform and truck, said links being pivotally connected to each. The motor, operating mechanism, excavator and elevator are mounted upon the platform and are movable vertically therewith. A windlass 4 is mounted upon the truck and a rope 5 is wound several times about the windlass and has its ends connected to opposite ends of the platform 2. The windlass 4 is adapted to be rotated by means of a crank and is provided with the usual ratchet mechanism to hold it in the adjusted position to hold the platform 2 at the required elevation. The links 3 incline forwardly when the platform is adjusted to bring the boring tool in contact with the surface of the ground. The links 3 are caused to assume an approximately vertical position when the platform 2 is elevated to move the boring tool upward to clear the ground when it is required to transport the machine from one point to another. Rotation of the windlass 4 in one direction or the other causes the links 3 to turn about their pivotal connections with the truck, the direction of rotation of the windlass causing the platform 2 to rise or to lower according to the result to be attained. As one end of the rope 5 winds upon the windlass the opposite end portion of the rope unwinds therefrom.

The motor is indicated at 6 and may be of the internal combustion type or of any variety best adapted for the purpose. A framework is mounted upon the platform 2 and is indicated at 7 and supports a guide pulley 8 at its upper end over which passes a rope or cord 9 which is adapted to wind upon a windlass 10 mounted upon the platform 2. The boring tool 11 is attached to the upper end of the rope or cord 9 by means of a swivel connection.

The boring tool is provided at its lower end with a bit of any type such as commonly employed for boring into the earth to provide openings for receiving fence posts or like supports. The boring tool is mounted in the platform 2 and in a horizontal portion 12 of the framework 7. A gear wheel 13 is mounted upon the part 12 of the framework and is held from vertical movement and is in mesh with a gear wheel 14 secured to a vertical shaft 15 which is connected with the motor by means of a drive pulley and belt or in any convenient way. The gear wheel 13 receives the rod of the boring tool and has a feather and spline connection therewith to admit of the boring tool moving vertically and at the same time having a rotary movement imparted thereto. The weight of the boring tool and adjunctive parts, such as the elevator, is amply sufficient to feed the same as the work progresses and the rapidity of the feed may be regulated by proper control of the windlass 10, thereby preventing choking of the tool in soft ground.

The elevator for removing the earth from the opening formed by the boring tool is of the screw type and is indicated at 16 and is attached to a tube or hollow shaft 17, which is mounted upon the rod of the boring tool. The tube or hollow shaft 17 is adapted to rotate freely and is movable vertically with the boring tool and its lower end receives the screw elevator 16, which latter rests upon or is in close contact with the head or bit of the boring tool so as to remove the loose earth from the bottom of the opening. A gear wheel 18 is mounted upon the platform 2 and is prevented from vertical movement, but is free to rotate and has a feather and spline connection with the tube or shaft 17 so as to impart a rotary movement thereto and to the screw elevator at all adjustments thereof. A gear wheel 19, secured to the lower end of the vertical shaft 15, is in mesh with the gear wheel 18 and transmits motion thereto. The gear wheel 18 is of less diameter than the gear wheel 13 and the gear wheel 19 is of greater diameter than the gear wheel 14, hence it follows that the screw elevator is rotated at a higher speed than the boring tool, which is of advantage since it insures a removal of all the loose earth from the opening as the same is bored.

When moving the machine from one point to another the platform 2 is elevated in the manner hereinbefore stated, thereby leaving the excavator and elevator clear of the ground so as to be out of the way. After the machine has been positioned to bring the excavator, digger or boring tool in proper position the platform 2 is lowered to bring the boring tool in contact with the ground, the position of the platform being fixed by holding the windlass 4 stationary by means of the ratchet mechanism coöperating therewith. The motor being in operation imparts a rotary movement to the boring tool and elevator. As the boring tool is rotated the opening is formed in the earth to receive the post or other similar article to be planted therein. As the boring tool descends and forms the opening the loose earth is removed from the opening and brought to the surface by means of the screw elevator in the manner well understood. By providing proper slack in the rope 9 the feed of the boring tool may be regulated. After the opening is formed the boring tool is removed therefrom by winding the rope 9 upon the windlass 10.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In an excavating machine of the character described, the combination of a digger, and a screw elevator mounted upon the digger and rotatable independently thereof.

2. In an excavating machine of the character described, the combination of a rotary digger, a screw elevator mounted upon the rotary digger, and means for rotating the digger and screw elevator at different relative speeds.

3. In an excavating machine of the character specified, the combination of a rotary digger, a hollow shaft mounted upon the rotary digger, a screw elevator carried by the hollow shaft with its lower end approaching close to the head or bit of the digger, gear wheels having a feather and spline connection with the rod of the digger and the said hollow shaft, and means for imparting rotary movement to the said gear wheels.

4. In an excavating machine of the character described, the combination of a framework, a rotary digger embodying a rod, a screw elevator mounted upon the rod of the rotary digger and embodying a hollow shaft, gear wheels mounted upon the framework and having a feather and spline connection with the rod of the digger and the hollow shaft of the screw elevator, means for imparting rotary movement to the said gear wheels, and means for raising and lowering the digger and the screw elevator mounted thereon.

5. In a machine of the character described, the combination of a truck, a platform provided with the excavating mechanism and the actuating means therefor, links pivotally connecting said platform with the truck, a windlass mounted upon the truck, and a rope wound about the windlass and having its end portions connected to the said platform.

In testimony whereof I affix my signature in presence of two witnesses.

ROY A. PETERS.

Witnesses:
 MAE T. PETERS,
 MARY L. PETERS.